(12) United States Patent
Kato et al.

(10) Patent No.: US 12,147,035 B2
(45) Date of Patent: Nov. 19, 2024

(54) HEAD-UP DISPLAY AND DISPLAY DEVICE (71) Applicant: Japan Display Inc., Tokyo (JP)

(72) Inventors: Takayuki Kato, Tokyo (JP); Shinichiro Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/198,006

(22) Filed: May 16, 2023

(65) Prior Publication Data

US 2023/0384587 A1 Nov. 30, 2023

(30) Foreign Application Priority Data

May 25, 2022 (JP) .................................. 2022-085210

(51) Int. Cl.
*G02B 27/01* (2006.01)
*G02F 1/1335* (2006.01)

(52) U.S. Cl.
CPC ... *G02B 27/0101* (2013.01); *G02F 1/133562* (2021.01); *G02B 2027/0118* (2013.01)

(58) Field of Classification Search
None
See application file for complete search history.

(56) References Cited

U.S. PATENT DOCUMENTS

2021/0132422 A1* 5/2021 Kim ...................... G02F 1/1335

FOREIGN PATENT DOCUMENTS

JP 2007264529 A 10/2007

* cited by examiner

*Primary Examiner* — Richard H Kim
(74) *Attorney, Agent, or Firm* — K&L Gates LLP (57) ABSTRACT

A head-up display includes a light source, a liquid crystal panel configured to transmit light from the light source and project an image, and a prism sheet configured to refract the light transmitted through the liquid crystal panel. The prism sheet includes a sheet surface parallel to a plate surface of the liquid crystal panel, and a plurality of prisms facing the plate surface of the liquid crystal panel on a side opposite to the sheet surface and arranged in parallel, the prisms are each formed in an angular shape in cross-section by a first prism surface and a second prism surface, the first prism surface being inclined with respect to the sheet surface, the second prism surface being inclined with respect to the sheet surface and making a larger angle with the sheet surface than the first prism surface, and an angle between the first prism surface and the sheet surface is 35° or larger.

5 Claims, 5 Drawing Sheets

HEAD-UP DISPLAY AND DISPLAY DEVICE

CROSS-REFERENCE TO RELATED APPLICATION

This application claims the benefit of priority from Japanese Patent Application No. 2022-085210 filed on May 25, 2022, the entire contents of which are incorporated herein by reference.

BACKGROUND

1. Technical Field

The present disclosure relates to a head-up display and a display device.

2. Description of the Related Art

Widely known are display devices used for vehicle head-up display devices that project an image onto a translucent body, such as a windshield, to cause a user to visually recognize a virtual image (e.g., Japanese Patent Application Laid-open Publication No. 2007-264529 (JP-A-2007-264529)). The display device includes a backlight, a liquid crystal display panel that transmits light from the backlight to project an image, a prism sheet that refracts light transmitted through the liquid crystal display panel, and a housing.

In the display device described in JP-A-2007-264529, if light from the outside, such as sunlight, is reflected by the prism sheet or other components, and the reflected light overlaps the virtual image, the visibility of the virtual image may possibly be reduced.

In view of the disadvantage described above, an object of the present disclosure is to provide a head-up display and a display device that suppress reduction in the visibility of a virtual image due to light from the outside being reflected and overlapping the virtual image.

SUMMARY

A head-up display according to an embodiment of the present disclosure includes a light source, a liquid crystal panel configured to transmit light from the light source and project an image, and a prism sheet configured to refract the light transmitted through the liquid crystal panel. The prism sheet includes a sheet surface parallel to a plate surface of the liquid crystal panel, and a plurality of prisms facing the plate surface of the liquid crystal panel on a side opposite to the sheet surface and arranged in parallel, the prisms are each formed in an angular shape in cross-section by a first prism surface and a second prism surface, the first prism surface being inclined with respect to the sheet surface, the second prism surface being inclined with respect to the sheet surface and making a larger angle with the sheet surface than the first prism surface, and an angle between the first prism surface and the sheet surface is 35° or larger.

A display device according to an embodiment of the present disclosure includes a light source, a liquid crystal panel configured to transmit light from the light source and project an image, and a prism sheet configured to refract the light transmitted through the liquid crystal panel. The prism sheet includes a sheet surface parallel to a plate surface of the liquid crystal panel, and a plurality of prisms facing the plate surface of the liquid crystal panel on a side opposite to the sheet surface and arranged in parallel, the prisms are each formed in an angular shape in cross-section by a first prism surface and a second prism surface, the first prism surface being inclined with respect to the sheet surface, the second prism surface being inclined with respect to the sheet surface and making a larger angle with the sheet surface than the first prism surface, and an angle between the first prism surface and the sheet surface is 35° or larger.

DETAILED DESCRIPTION

Hereinafter, an embodiment of the present disclosure will be described with reference to the drawings. Contents described in the following embodiment do not limit the present disclosure. Components described below include those that can be easily assumed by those skilled in the art and substantially the same components. Furthermore, the components described below can be appropriately combined.

What is disclosed herein is merely an example, and it is needless to say that appropriate modifications within the gist of the invention at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has already been referred to, and detail explanation thereof can be appropriately omitted.

A Dx-direction illustrated in the drawings is the height direction of a head-up display 1, a Dy-direction is the width direction of the head-up display 1, and a Dz-direction is the depth direction of the head-up display 1. The directions of Dx, Dy, and Dz are given by way of example only and are not intended to limit the present disclosure.

Figure 1:
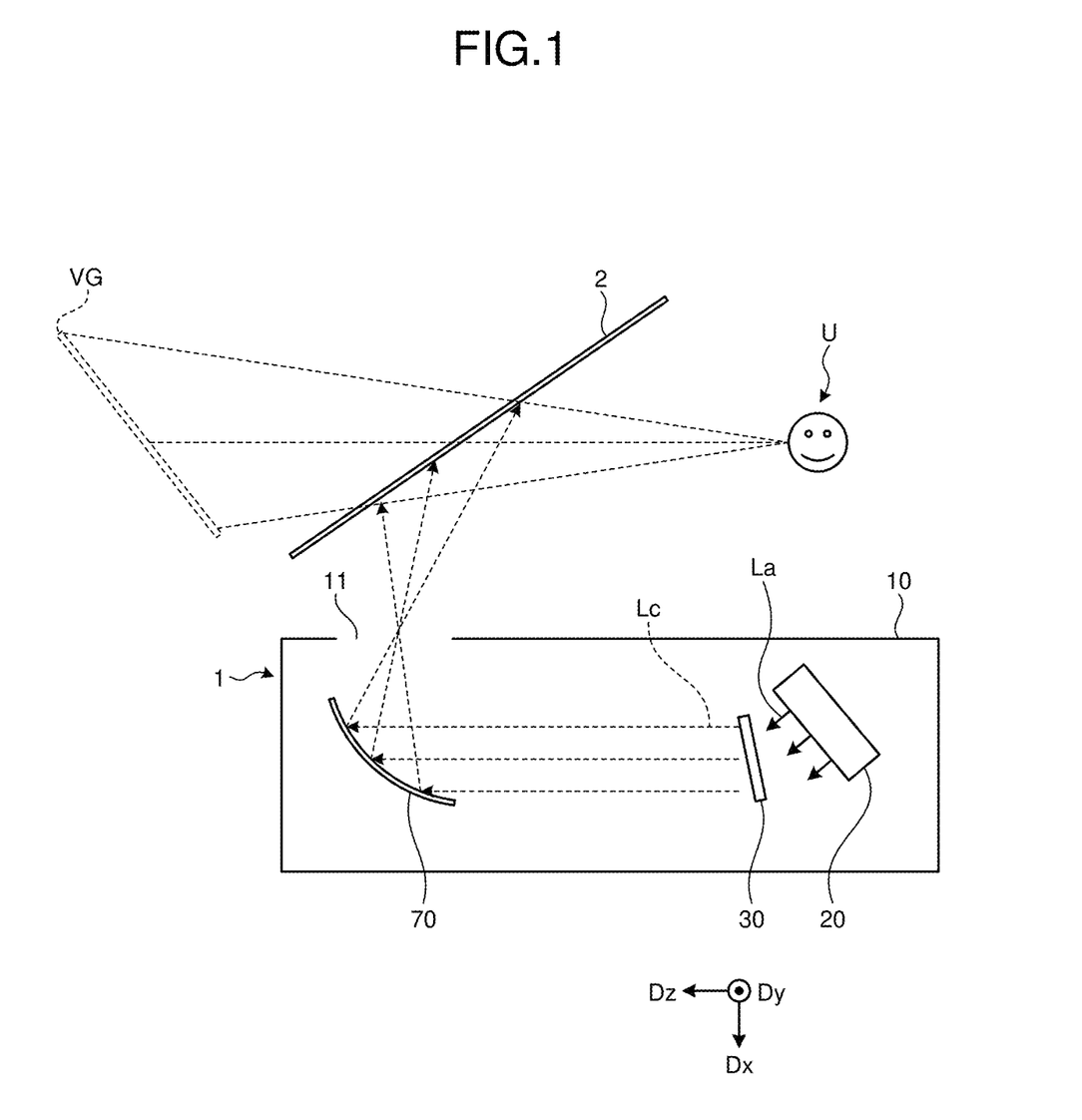
FIG. 1 is a schematic of a head-up display according to an embodiment.

FIG. 1 is a schematic of a head-up display according to an embodiment. A head-up display (hereinafter referred to as HUD) 1 is an example of a display device and projects an image onto a translucent body 2 to cause a user U to visually recognize a virtual image VG. The translucent body 2 is a windshield, for example. Needless to say, the translucent body 2 is not limited thereto and simply needs to have a configuration on which the image from the HUD 1 is projected.

The HUD 1 includes a housing 10, a light source 20, an image output unit 30, and an optical member 70. The housing 10 has a box shape and houses the light source 20, the image output unit 30, and the optical member 70.

Figure 2:
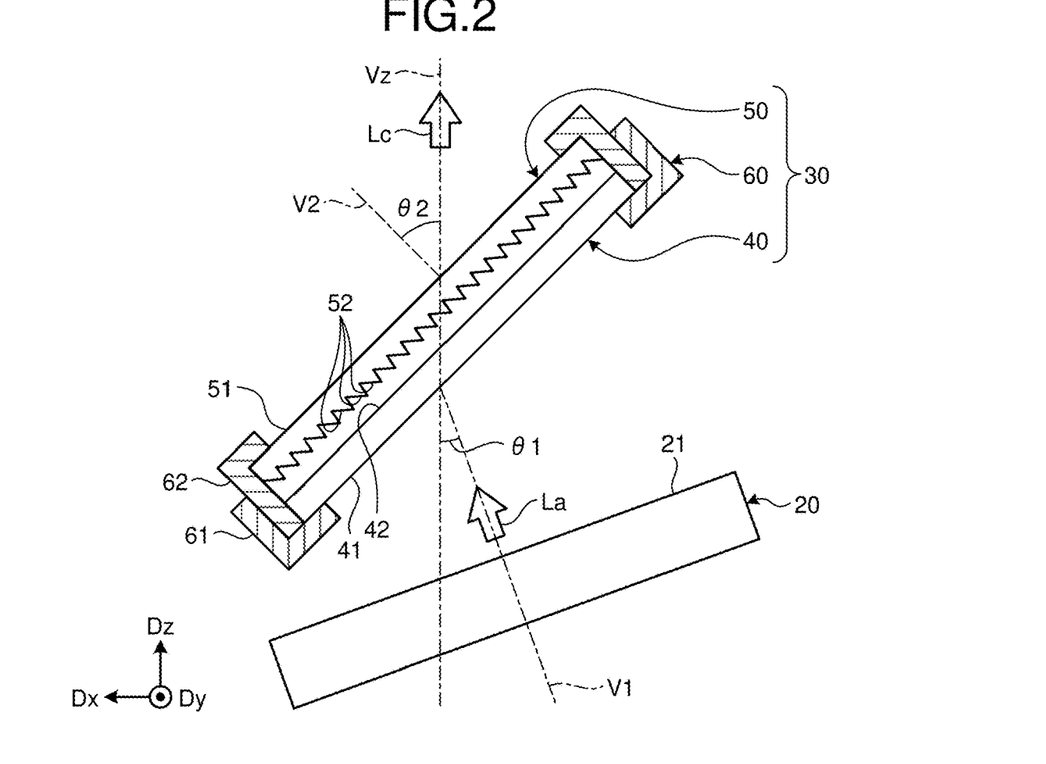
FIG. 2 is a schematic of a light source and an image output unit.

FIG. 2 is a schematic of the light source and the image output unit. The light source 20 includes light-emitting elements (not illustrated), such as light-emitting diodes (LED), in a rectangular parallelepiped case. The light source 20 emits light to the image output unit 30. The optical axis of the light output from the light source 20 is orthogonal to a light source output surface 21 of the light source 20. The light source output surface 21 is parallel to the Dy-direction and is inclined around an axis parallel to the Dy-direction (which is not illustrated, and hereinafter is referred to as a Dy-axis) with respect to an output axis Vz. The output axis Vz is an axis for aligning the optical axis of output light Lc, which will be described later, output from the image output unit 30. Specifically, the output axis Vz is parallel to the Dz-direction and extends from the image output unit 30 to the optical member 70.

The angle between a perpendicular V1 of the light source output surface 21 and the output axis Vz is referred to as a first inclination angle $\theta 1$. The first inclination angle $\theta 1$ is an acute angle. The light source output surface 21 is not necessarily inclined with respect to the output axis Vz and may be orthogonal thereto. In this case, the first inclination angle $\theta 1$ is zero.

The light output from the light source 20 is incident on the image output unit 30 as incident light La. The optical axis of the incident light La is parallel to the perpendicular V1. The image output unit 30 transmits and refracts the incident light La and outputs output light Lc along the output axis Vz. The image output unit 30 includes a liquid crystal panel 40, a prism sheet 50, and a support 60.

The liquid crystal panel 40 transmits light from the light source 20 and projects an image. The liquid crystal panel 40 is a transmissive liquid crystal display panel. The liquid crystal panel 40 faces the light source 20 and has a panel incident surface 41 and a panel output surface 42. The panel incident surface 41 is a surface on which the light from the light source 20 is incident as the incident light La. The panel output surface 42 is a surface from which the incident light La is output as transmitted light transmitted through the liquid crystal panel 40.

The panel incident surface 41 and the panel output surface 42 are parallel to each other. The panel incident surface 41 and the panel output surface 42 are inclined around the Dy-axis with respect to the light source output surface 21.

The liquid crystal panel 40 includes a plurality of pixels driven by an active matrix system. The pixels are two-dimensionally arrayed along the plate surface of the liquid crystal panel 40. In an image output region (not illustrated) provided with the pixels, the pixels are individually controlled to form a light transmission pattern corresponding to the image to be projected as the virtual image VG. As a result, the amount of light is adjusted when the incident light La is transmitted through the image output region, and the incident light La is output as transmitted light. The optical axes of the incident light La and the transmitted light are parallel to each other.

The prism sheet 50 refracts light transmitted through the liquid crystal panel 40. Specifically, the prism sheet 50 refracts the transmitted light output from the panel output surface 42 to be output along the output axis Vz as the output light Lc. In other words, the optical axis of the output light Lc is inclined with respect to the optical axis of the incident light La parallel to the optical axis of the transmitted light. The prism sheet 50 outputs the output light Lc toward the optical member 70. The prism sheet 50 has a sheet surface 51 and a plurality of prisms 52.

The sheet surface 51 is parallel to the plate surface of the liquid crystal panel 40. Specifically, the sheet surface 51 is parallel to the panel output surface 42 of the liquid crystal panel 40. The sheet surface 51 and the panel output surface 42 are inclined around the Dy-axis with respect to the output axis Vz. The angle between a perpendicular V2 of the sheet surface 51 and the output axis Vz is referred to as a second inclination angle $\theta 2$. The second inclination angle $\theta 2$ corresponds to the output angle of the output light Lc output from the sheet surface 51. The second inclination angle $\theta 2$ is an acute angle and is larger than the first inclination angle $\theta 1$. The second inclination angle $\theta 2$ may be equal to the first inclination angle $\theta 1$.

The prisms 52 face the plate surface of the liquid crystal panel 40 on the side opposite to the sheet surface 51. Specifically, the prisms 52 face the panel output surface 42 of the liquid crystal panel 40.

Figure 3:
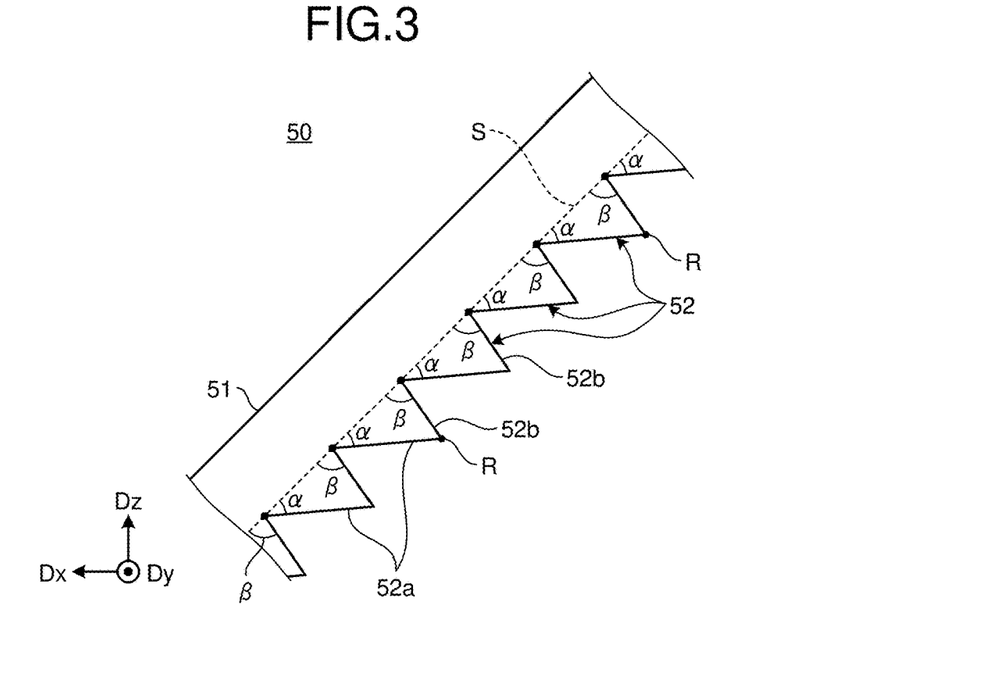
FIG. 3 is an enlarged side view of a prism sheet.

FIG. 3 is an enlarged side view of the prism sheet 50. The prisms 52 are arranged on a plane S parallel to the sheet surface 51. The prisms 52 are each formed in an angular shape in cross-section by a first prism surface 52a and a second prism surface 52b.

The first prism surface 52a and the second prism surface 52b are each inclined around the Dy-axis with respective to the sheet surface 51. The second prism surface 52b makes a larger angle with the sheet surface 51 than the first prism surface 52a. In other words, a first prism angle $\alpha$ of the first prism surface 52a with respect to the sheet surface 51 is smaller than a second prism angle $\beta$ of the second prism surface 52b with respect to the sheet surface 51. The first prism angle $\alpha$ and the second prism angle $\beta$ will be described later in greater detail.

The prisms 52 are arranged in parallel. Specifically, ridge lines R each formed by the first prism surface 52a and the second prism surface 52b of the respective prisms 52 are arranged along the Dy-axis. In other words, the prisms 52 are arranged with their ridge lines R parallel to each other.

In two prisms 52 arranged side by side out of the prisms 52, the first prism surface 52a of one prism 52 and the second prism surface 52b of the other prism 52 are continuously formed. In other words, the plane S is not exposed.

As illustrated in FIG. 2, the support 60 supports the liquid crystal panel 40 and the prism sheet 50. The support 60 includes a first support part 61 that supports the liquid crystal panel 40 and a second support part 62 that supports the prism sheet 50. The first support part 61 supports the periphery of the panel incident surface 41 and is bonded to the periphery of the panel incident surface 41 by an adhesive or the like. The first support part 61 also supports the second support part 62. The second support part 62 supports the periphery of the sheet surface 51 and is bonded to the periphery of the sheet surface 51 by an adhesive or the like.

As indicated by the dashed arrows in FIG. 1, the optical member 70 guides the output light Lc to the translucent body 2 through an opening 11 of the housing 10. Specifically, the optical member 70 is a concave mirror. The optical member 70 may be composed of a plurality of concave mirrors and reflective mirrors.

The output light Lc guided by the optical member 70 is projected onto the translucent body 2. The user U who looks at the output light Lc projected onto the translucent body 2 visually recognizes the virtual image VG.

As described above, the output light Lc from the image output unit 30 is output along the output axis Vz, and the panel output surface 42 of the liquid crystal panel 40 is inclined around the Dy-axis with respect to the output axis Vz. This configuration enables the user U to visually recognize the virtual image VG as if the virtual image VG were three-dimensionally formed in the Dz-direction.

As described above, the light source output surface 21 of the light source 20 is inclined around the Dy-axis with respect to the output axis Vz. In this case, the incident angle of the incident light La output from the light source output surface 21 and incident on the panel incident surface 41 is smaller than a case where the light source output surface 21 is orthogonal to the output axis Vz. This configuration can suppress reduction in the luminance of the light that forms the virtual image VG and the contrast of the virtual image VG.

The following describes the first prism angle α and the second prism angle β in greater detail. The first prism angle α and the second prism angle β are determined to be the angles that refract the transmitted light output from the panel output surface 42 of the liquid crystal panel 40 along the output axis Vz.

In the HUD 1, light from the outside, such as sunlight, (hereinafter referred to as external light) Lg may possibly enter the housing 10 through the opening 11, travel along the output axis Vz in the direction opposite to the traveling direction of the output light Lc, and be reflected by the prism sheet 50 or other components. If the reflected light overlaps the virtual image VG, the visibility of the virtual image VG is reduced. The first prism angle α and the second prism angle β are determined to be the angles that suppress overlapping of the reflected light with the virtual image VG. Specifically, the first prism angle α and the second prism angle β are determined based on the reflection angle of the reflected light described below.

Figure 4:
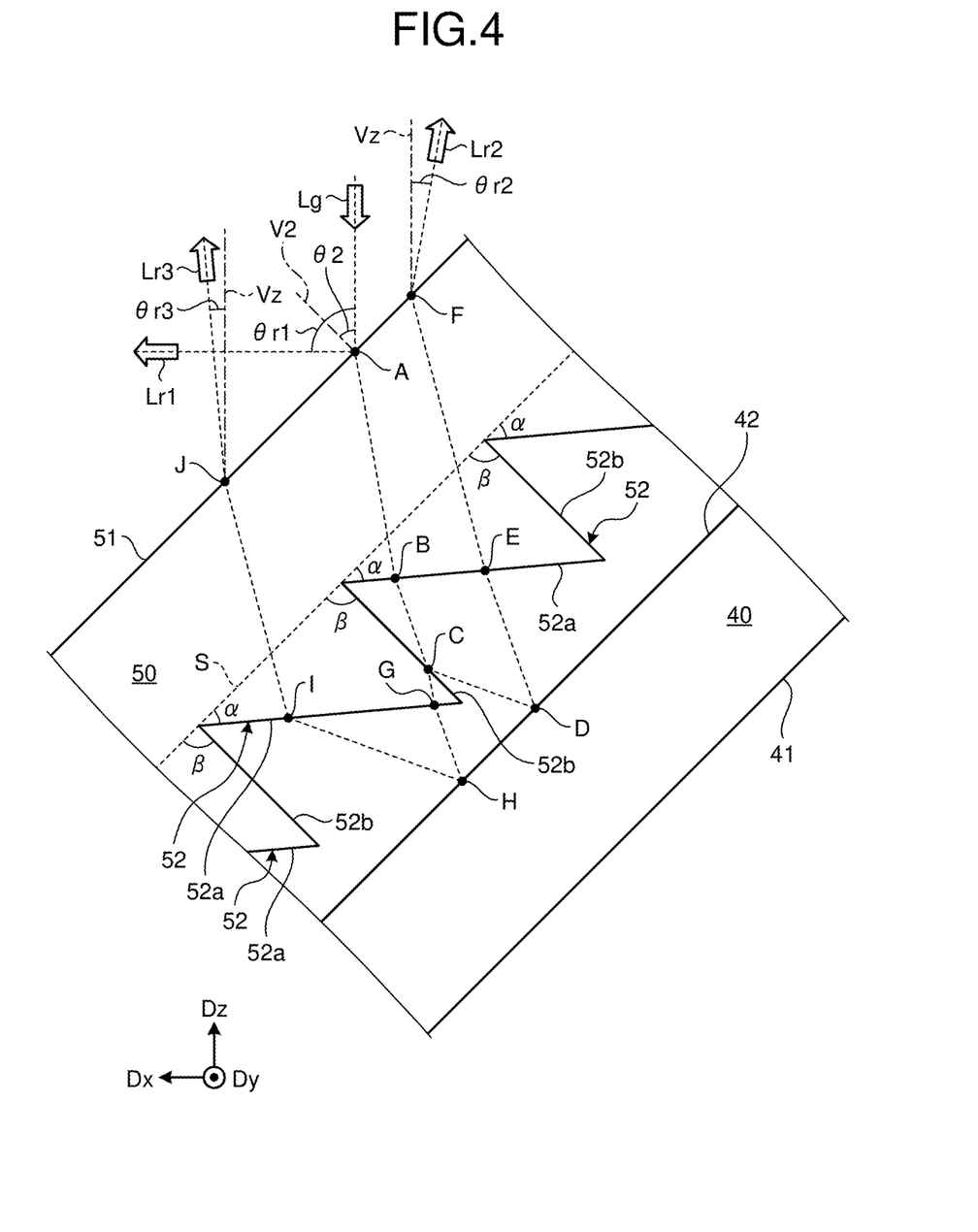
FIG. 4 is a view of travel of external light and reflected light in the image output unit.

FIG. 4 is a view of travel of the external light and the reflected light in the image output unit. In FIG. 4, travel of the external light Lg is represented by dashed lines. The reflected light is the external light Lg reflected by the prism sheet 50, the panel output surface 42, or other components, and then output from the image output unit 30. The reflection angle of the reflected light is defined as the angle between the optical axis of the reflected light and the output axis Vz.

In FIG. 4, the second inclination angle θ2 of the sheet surface 51 and the panel output surface 42 with respect to the output axis Vz is 45°, the first prism angle α is 40°, and the second prism angle β is 90°.

The external light Lg travels along the output axis Vz and reaches a point A on the sheet surface 51. Part of the external light Lg that reaches the point A is reflected at the point A on the sheet surface 51. The external light Lg reflected at the point A is referred to as first reflected light Lr1, and the reflection angle of the first reflected light Lr1 is referred to as a first reflection angle θr1. The first reflected light Lr1 is reflected once at the point A on the sheet surface 51.

The external light Lg not reflected at the point A on the sheet surface 51 is refracted at the point A and is incident on the prism sheet 50, and is refracted at a point B on the first prism surface 52a and is output from the prism sheet 50. The angle at which the external light Lg is refracted depends on the relative refractive index between the material of the prism sheet 50 and the air outside the prism sheet 50.

Part of the external light Lg output from the point B on the first prism surface 52a is reflected at a point C on the second prism surface 52b and is then reflected at a point D on the panel output surface 42. The external light Lg reflected at the point D is refracted at a point E on the first prism surface 52a and is incident on the prism sheet 50, and is refracted at a point F on the sheet surface 51 and is output from the prism sheet 50. The external light Lg output from the point F is referred to as second reflected light Lr2, and the reflection angle of the second reflected light Lr2 is referred to as a second reflection angle θr2.

The second reflected light Lr2 is reflected twice in total at the point C on the second prism surface 52b and at the point D on the panel output surface 42. The prism sheet 50 and the liquid crystal panel 40 have a specific reflectance (e.g., 8%) based on the material and other factors. Therefore, the amount of light decreases as the number of reflections increases. The number of reflections of the second reflected light Lr2 is larger than that of the first reflected light Lr1, and the amount of light of the second reflected light Lr2 is smaller than that of the first reflected light Lr1.

By contrast, the external light Lg not reflected at the point C on the second prism surface 52b is refracted at the point C and is incident on the prism sheet 50, and is refracted at a point G on the first prism surface 52a and is output from the prism sheet 50. The external light Lg output from the point G is reflected at a point H on the panel output surface 42. The external light Lg is then refracted at a point I on the first prism surface 52a and is incident on the prism sheet 50, and is refracted at a point J on the sheet surface 51 and is output from the prism sheet 50. The external light Lg output from the point J is referred to as third reflected light Lr3, and the reflection angle of the third reflected light Lr3 is referred to as a third reflection angle θr3.

The third reflected light Lr3 is reflected once at the point H on the panel output surface 42. The number of reflections of the second reflected light Lr2 is larger than that of the third reflected light Lr3, and the amount of light of the second reflected light Lr2 is smaller than that of the third reflected light Lr3. If the amount of reflected light is relatively small, like the second reflected light Lr2, the visibility of the virtual image VG is not reduced when the reflected light overlaps the virtual image VG.

If the reflected light is greatly inclined with respect to the output axis Vz, the reflected light does not overlap the virtual image VG, thereby suppressing reduction in the visibility of the virtual image VG. Therefore, the first prism angle α and the second prism angle β are determined such that the reflected light the number of reflections of which is one is relatively greatly inclined with respect to the output axis Vz. In other words, the first prism angle α and the second prism angle β are determined such that the first reflection angle θr1 and the third reflection angle θr3 are relatively large. The first reflection angle θr1 and the third reflection angle θr3 are the reflection angles of the optical axes of the first reflected light Lr1 and the third reflected light Lr3 the number of reflections of which is one with respect to the output axis Vz. It is preferable that the second reflection angle θr2 of the second reflected light Lr2 the number of reflections of which is two be also relatively large.

The travel of the external light Lg that reaches the point A on the prism sheet 50 has been described in FIG. 4. The external light Lg, however, may reach points other than the point A on the prism sheet 50, and reflected light with a reflection angle different from that of the first reflected light Lr1, the second reflected light Lr2, and the third reflected light Lr3 illustrated in FIG. 4 may be output. Therefore, to determine the first prism angle α and the second prism angle β, a simulation is performed to derive the reflection angle of the reflected light based on a plurality of rays of the external light Lg incident on the prism sheet 50 at different positions.

Figure 5:
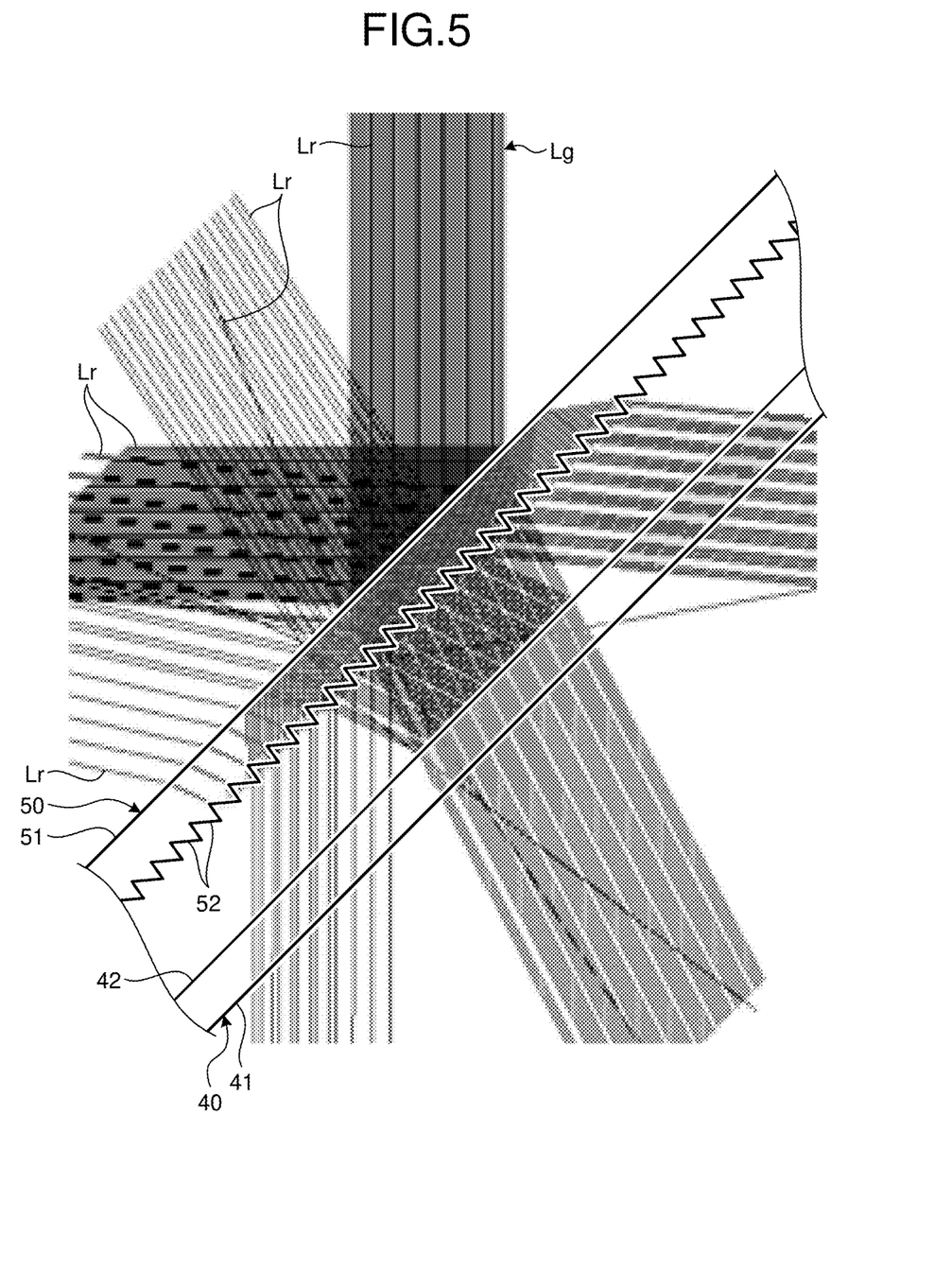
FIG. 5 is a view of an example of simulation results of the reflected light.

FIG. 5 is a view of an example of simulation results of the reflected light. In FIG. 5, the second inclination angle θ2 of the sheet surface 51 and the panel output surface 42 with respect to the output axis Vz is 45°, the first prism angle α is 40°, and the second prism angle β is 90°. One hundred rays of light serving as the external light Lg along the output axis Vz are incident on the sheet surface 51 from different positions.

The external light Lg incident on the sheet surface 51 is reflected and refracted by the sheet surface 51, the prisms 52, and other components as described above, and is output from the sheet surface 51 as a plurality of rays of the reflected light Lr. The number of reflections is up to one. Total reflection, however, is not counted as the number of reflections.

Table 1 indicates an example of the simulation results of the reflected light Lr. Table 1 indicates the smallest reflection angle of the reflection angles of the rays of the reflected light Lr when the second inclination angle θ2 of the sheet surface 51 and the panel output surface 42 with respect to the output axis Vz is 45°, and the second prism angle β is 90°, and when the first prism angle α is changed from 20° to 50° in 5° increments.

The reflected light Lr is more greatly inclined with respect to the output axis Vz and does not overlap the virtual image VG as the reflection angle of the reflected light Lr is larger. In other words, a larger reflection angle indicates a better result.

In Table 1, the reflection angle is relatively large when the first prism angle α is 35° or larger. In other words, the first prism angle α is preferably 35° or larger. The first prism angle α is more preferably 35° to 45°.

TABLE 1

| | α | | | | | | |
|---|---|---|---|---|---|---|---|
| | 50° | 45° | 40° | 35° | 30° | 25° | 20° |
| Reflection Angle | 17.6° | 25.4° | 32.7° | 19.2° | 16.6° | 5.5° | 23.1° |

If the first prism angle α is smaller than 20°, the incident angle of the incident light La output from the light source output surface 21 and incident on the panel incident surface 41 is large. As a result, the improvement effect on the luminance of the light that forms the virtual image VG and the contrast of the virtual image VG is reduced. If the first prism angle α is larger than 50°, the prism sheet 50 fails to refract the transmitted light from the liquid crystal panel 40 along the output axis Vz. Therefore, the first prism angle α is set from 20° to 50° in the simulation.

Table 2 indicates an example of the simulation results of the reflected light Lr. Table 2 indicates the smallest reflection angle of the reflection angles of the rays of the reflected light Lr when the second inclination angle θ2 of the sheet surface 51 and the panel output surface 42 with respect to the output axis Vz is 45°, and the first prism angle α is 40°, and when the second prism angle β is changed from 60° to 90° in 5° increments.

In Table 2, the reflection angle is relatively large when the second prism angle β is 75° or smaller. In other words, the second prism angle β is preferably 75° or smaller.

TABLE 2

| | β | | | | | | |
|---|---|---|---|---|---|---|---|
| | 90° | 85° | 80° | 75° | 70° | 65° | 60° |
| Reflection Angle | 1.6° | 7.0° | 14.7° | 22.5° | 32.6° | 32.6° | 22.6° |

If the second prism angle β is smaller than 60°, the amount of light transmitted through the liquid crystal panel 40 and incident on the second prism surface 52b is relatively large, and the amount of light transmitted from the prism sheet 50 in the Vz-direction is relatively small. As a result, the luminance of the output light Lc is relatively low. If the second prism angle β is larger than 90°, the second prism surface 52b is inversely tapered, thereby increasing the difficulty of manufacturing the prism sheet 50. Therefore, the second prism angle R is set from 60° to 90° in the simulation.

As described above, the first prism angle α is preferably 35° or larger, and the second prism angle β is preferably 75° or smaller. In other words, if the prism sheet 50 is composed of a plurality of prisms 52 with a first prism angle α of 35° or larger and a second prism angle β of 75° or smaller, the reflected light Lr of the external light Lg does not overlap the virtual image VG, thereby suppressing reduction in the visibility of the virtual image VG.

The reflection angle of the reflected light Lr the number of reflections of which is two was derived by a simulation by combining the first prism angle α and the second prism angle β that show good results in the results indicated by Tables 1 and 2.

Table 3 indicates an example of the simulation results of the reflected light Lr the number of reflections of which is two. Table 3 indicates the smallest reflection angle of the reflection angles of the rays of the reflected light Lr when the second inclination angle θ2 of the sheet surface 51 and the panel output surface 42 with respect to the output axis Vz is 45°, the first prism angle α is 35° and 40°, and the second prism angle β is 70° and 75°.

In Table 3, some of the rays of the reflected light Lr have a relatively small reflection angle. In this simulation, however, the number of reflections is two, and the intensity of the reflected light Lr is relatively low. In addition, the reflected light Lr with a relatively small reflection angle is only one or two of all (100) rays of the reflected light Lr. Therefore, the reflected light Lr with a relatively small reflection angle has a significantly small effect on the visibility of the virtual image. In the simulation results of the reflected light Lr the number of reflections of which is two, the reflection angle is relatively large, and a particularly good result is obtained for the reflected light Lr the number of reflections of which is two when the first prism angle α is 40°, and the second prism angle β is 70°.

| | α | | | |
|---|---|---|---|---|
| | 40° | 40° | 35° | 35° |
| | β | | | |
| | 75° | 70° | 75° | 70° |
| Reflection Angle | 11.2° | 24.5° | 1.9° | 3.7° |

If the first prism angle α is 35° to 40°, and the second prism angle β is 70° to 75°, the prism sheet 50 can refract the light transmitted through the liquid crystal panel 40 along the output axis Vz, and the prism sheet 50 is easy to manufacture.

In the simulation described above, the second inclination angle θ2 of the sheet surface 51 and the panel output surface 42 with respect to the output axis Vz is 45°. Also in a simulation where the second inclination angle θ2 is other than 45°, the reflection angle is relatively large, and good results are obtained when the first prism angle α is 35° or smaller, and the second prism angle β is 75° or smaller similarly to the simulation results described above. If the second inclination angle θ2 is in a range of 45±3°, good results are obtained similarly to when the second inclination angle θ2 is 45°. Furthermore, in the simulation where the second inclination angle θ2 is other than 45°, the reflection angle is relatively large, and good results are obtained for the reflected light Lr the number of reflections of which is two when the first prism angle α is 35° and 40°, and the second prism angle β is 70°. If the second inclination angle θ2 is in a range of 45±3°, good results are obtained similarly to when the second inclination angle θ2 is 45°.

Other action effects provided by the modes described in the above-mentioned embodiment that are obvious from description of the present specification or at which those skilled in the art can appropriately arrive should naturally be interpreted to be provided by the present disclosure.

Figure 6:
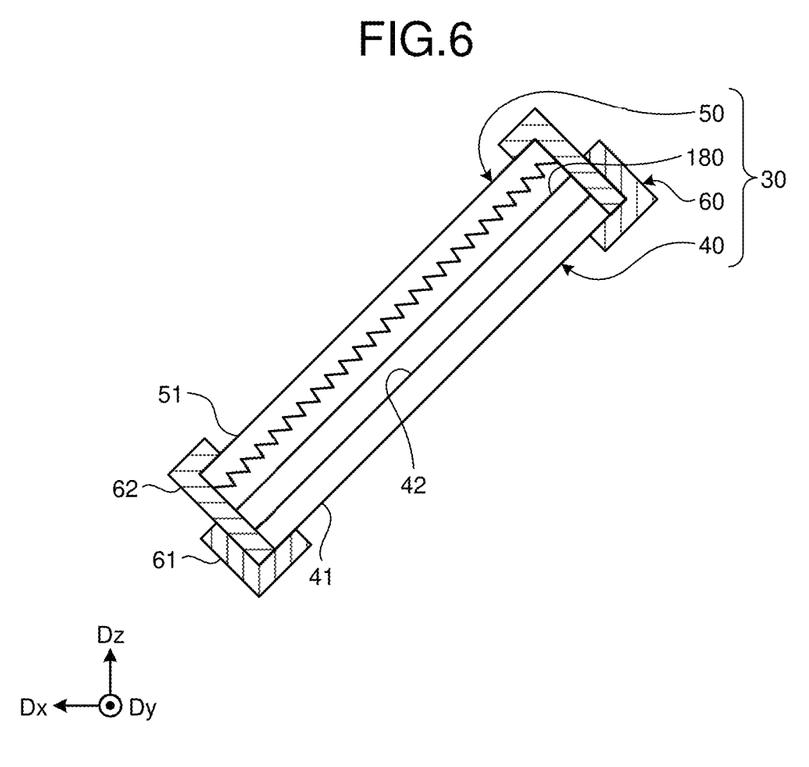
FIG. 6 is a schematic of the image output unit according to a modification of the embodiment.

FIG. 6 is a schematic of the image output unit according to a modification of the embodiment. The image output unit 30 according to the modification further includes a diffusion plate 180 between the liquid crystal panel 40 and the prism sheet 50. The diffusion plate 180 is bonded to the panel output surface 42. The diffusion plate 180 diffuses and transmits incident light. The diffusion plate 180 can reduce moiré caused by interference of light. The diffusion plate 180 also reduces the amount of reflected light Lr reflected on the panel output surface 42 and output from the sheet surface 51. Therefore, the diffusion plate 180 can suppress reduction in the visibility of the virtual image VG.

The present disclosure is also applicable to display devices other than the HUD 1, such as navigation systems, smartphones, tablets, and virtual reality (VR) goggles.

What is claimed is:

1. A head-up display comprising:
    a light source; and
    an image output unit, the image output unit including:
        a liquid crystal panel configured to transmit light from the light source and project an image; and
        a prism sheet configured to refract the light transmitted through the liquid crystal panel, wherein
    the prism sheet comprises:
        a sheet surface parallel to a plate surface of the liquid crystal panel; and
        a plurality of prisms facing the plate surface of the liquid crystal panel on a side opposite to the sheet surface and arranged in parallel,
    the prisms are each formed in an angular shape in cross-section by a first prism surface and a second prism surface, the first prism surface being inclined with respect to the sheet surface, the second prism surface being inclined with respect to the sheet surface and making a larger angle with the sheet surface than the first prism surface,
    an angle between the first prism surface and the sheet surface is 35° or larger,
    the light source and the liquid crystal panel are inclined with respect to an output axis, the output axis aligning an optical axis of output light output from the image output unit, and
    an inclination angle of the light source with respect to the output axis is smaller than an inclination angle of the liquid crystal panel with respect to the output axis.

2. The head-up display according to claim 1, wherein the angle between the second prism surface and the sheet surface is 75° or smaller.

3. The head-up display according to claim 1, wherein
    the angle between the first prism surface and the sheet surface is 35° to 40°, and
    the angle between the second prism surface and the sheet surface is 70° to 75°.

4. The head-up display according to claim 1, wherein, in two prisms arranged side by side, the first prism surface of a first prism and the second prism surface of a second prism are continuously formed.

5. A display device comprising:
    a light source; and
    an image output unit, the image output unit including:
        a liquid crystal panel configured to transmit light from the light source and project an image; and
        a prism sheet configured to refract the light transmitted through the liquid crystal panel, wherein
    the prism sheet comprises:
        a sheet surface parallel to a plate surface of the liquid crystal panel; and
        a plurality of prisms facing the plate surface of the liquid crystal panel on a side opposite to the sheet surface and arranged in parallel,
    the prisms are each formed in an angular shape in cross-section by a first prism surface and a second prism surface, the first prism surface being inclined with respect to the sheet surface, the second prism surface being inclined with respect to the sheet surface and making a larger angle with the sheet surface than the first prism surface,
    an angle between the first prism surface and the sheet surface is 35° or larger,
    the light source and the liquid crystal panel are inclined with respect to an output axis, the output axis aligning an optical axis of output light output from the image output unit, and
    an inclination angle of the light source with respect to the output axis is smaller than an inclination angle of the liquid crystal panel with respect to the output axis.

* * * * *